US006065351A

United States Patent [19]
Nagaoka et al.

[11] Patent Number: 6,065,351
[45] Date of Patent: May 23, 2000

[54] FLOW RATE MEASUREMENT METHOD AND ULTRASONIC FLOW METER

[75] Inventors: Yukio Nagaoka, Souraku-gun; Motoyuki Nawa; Kenzo Ohji, both of Ikoma, all of Japan

[73] Assignee: Matsushita Electric Industrial Co., Ltd., Osaka, Japan

[21] Appl. No.: 08/817,442

[22] PCT Filed: Oct. 19, 1995

[86] PCT No.: PCT/JP95/02142

§ 371 Date: Apr. 18, 1997

§ 102(e) Date: Apr. 18, 1997

[87] PCT Pub. No.: WO96/12933

PCT Pub. Date: Feb. 5, 1996

[30] Foreign Application Priority Data

Oct. 19, 1994 [JP] Japan .................................. 6-253414

[51] Int. Cl.[7] ...................................................... G01F 1/66
[52] U.S. Cl. ....................................................... 73/861.28
[58] Field of Search ........................... 73/861.27, 861.28, 73/861.31, 861.29

[56] References Cited

U.S. PATENT DOCUMENTS

| | | | |
|---|---|---|---|
| 3,392,574 | 7/1968 | Lemon et al. | 73/861.27 |
| 3,625,057 | 12/1971 | Yoshiyama et al. | 73/861.27 |
| 3,653,259 | 4/1972 | McShane | 73/861.27 |
| 3,720,105 | 3/1973 | Cirulis | 73/861.28 |
| 3,780,577 | 12/1973 | Brown | 73/861.28 |
| 3,882,722 | 5/1975 | McShane | 73/861.28 |
| 4,003,256 | 1/1977 | Donelan et al. . | |
| 4,022,058 | 5/1977 | Brown | 73/861.28 |
| 4,069,713 | 1/1978 | Gassmann | 73/861.08 |
| 4,240,292 | 12/1980 | Zalessky et al. . | |
| 4,246,800 | 1/1981 | Bidgood et al. | 73/861.28 |
| 4,372,167 | 2/1983 | Loveland | 73/861.28 |
| 4,380,934 | 4/1983 | Okuda et al. | 73/861.23 |
| 4,389,899 | 6/1983 | Krause | 73/861.28 |
| 5,329,821 | 7/1994 | Birnbaum et al. . | |
| 5,421,212 | 6/1995 | Mayranen et al. | 73/861.29 |
| 5,602,343 | 2/1997 | Franklin | 73/861.29 |
| 5,668,326 | 9/1997 | Brown | 73/861.27 |
| 5,753,824 | 5/1998 | Fletcher-Haynes | 73/861.28 |
| 5,831,175 | 11/1998 | Fletcher-Haynes | 73/861.28 |
| 5,856,622 | 1/1999 | Yamamoto et al. | 73/861.28 |

FOREIGN PATENT DOCUMENTS

| | | |
|---|---|---|
| 61-104224 | 5/1986 | Japan . |
| 62-8592 | 2/1987 | Japan . |
| 5-35364 | 5/1993 | Japan . |

Primary Examiner—Benjamin R. Fuller
Assistant Examiner—Jewel V. Thompson
Attorney, Agent, or Firm—Wenderoth, Lind & Ponack, L.L.P.

[57] ABSTRACT

An ultrasonic flow meter includes a conduit through which a fluid flows, an ultrasonic generator, a receiver for receiving ultrasonic waves on the upstream or downstream side of the generator, a time counter for determining the propagation time of the ultrasonic wave, a flow rate calculator for calculating the flow rate from the propagation time, and a timing controller. The timing controller sets a delay time corresponding to the flow rate measured from the relation between a flow rate which is set in advance, and the measured delay time. After the passage of this delay time the ultrasonic wave is emitted from the generator on the basis of a driving signal outputted from a trigger section and the flow rate is determined. Since the flow rate is thus measured with the delay time suitable for the flow rate, the flow rate is correctly determined, and power consumption is reduced.

26 Claims, 9 Drawing Sheets

FLOW RATE MEASUREMENT METHOD AND ULTRASONIC FLOW METER

TECHNICAL FIELD

The present invention relates to a method of measuring a flow rate of gas or liquid by utilizing ultrasonic waves and to an ultrasonic flow meter which executes the method of measuring.

BACKGROUND ART

U.S. Pat. No. 4,483,202 discloses an ultrasonic flow meter. The flow meter comprises a conduit through which a fluid flows and a pair of ultrasonic transducers disposed in the conduit along a line which is inclined by a predetermined angle with respect to a fluid flowing direction. In the operation, initially, an ultrasonic wave is emitted from the ultrasonic transducer disposed on the upstream side with respect to the flowing direction, toward the downstream side, and is received by the ultrasonic transducer on the downstream side. Then the propagation time from the emission to the reception of the ultrasonic wave is determined. Subsequently, an ultrasonic wave is emitted from the ultrasonic transducer disposed on the downstream side with respect to the flowing direction, toward the upstream side, and is received by the ultrasonic transducer on the upstream side, and the propagation time from the emission to the reception of the ultrasonic wave is determined. Substituting the two propagation times into a well-known equation yields the velocity of the fluid, with which the rate of flow is determined.

In such a well-known ultrasonic flow meter as described above, both velocity and rate of flow are measured by emitting ultrasonic waves at a predetermined time interval regardless of the flow rate. As a result, the conventional ultrasonic flow meter has a large power consumption, which causes a battery to run down in a short period of time.

SUMMARY OF THE INVENTION

The invention is intended to provide a method and an apparatus for measuring flow rate of a fluid with ultrasonic waves in which power consumption can be minimized by measuring the flow rates at a suitable time interval depending on a flow rate.

An ultrasonic measuring method in accordance with the invention comprises:

(a) emitting an ultrasonic wave in a direction which is the same as or opposite to a flow of fluid;

(b) receiving the ultrasonic wave;

(c) determining a propagation time from the emission to the reception of the ultrasonic wave;

(d) determining a flow rate from the propagation time;

(e) setting a delay time corresponding to the flow rate on the basis of a relationship between the flow rate and the delay time in which the delay time decreases with increase in the flow rate; and (f) repeating (a) to (e) after the lapse of the delay time.

The relation between the flow rate and the delay time can be set so that the delay time decreases linearly, stepwise, or inversely with increase in the flow rate.

Another method for measuring a flow rate in accordance with the invention comprises:

(a) emitting an ultrasonic wave in a direction which is the same as or opposite to a flow of fluid;

(b) receiving the ultrasonic wave;

(c) determining a propagation time from the emission to the reception;

(d) determining a flow rate from the propagation time;

(e) storing the flow rate as flow rate data;

(f) executing (a) to (e) at least twice;

(g) setting a delay time corresponding to the flow rate from the stored flow rate data on the basis of a relation between the flow rate and the delay time in which the delay time decreases with increasing in the flow rate; and (h) repeating (a) to (e) after the lapse of the delay time.

Another method for measuring a flow rate in accordance with the invention comprises:

(a) emitting an ultrasonic wave in a direction which is the same as or opposite to a flow of fluid;

(b) receiving the ultrasonic wave;

(c) determining a propagation time from the emission to the reception;

(d) determining a flow rate from the propagation time;

(e) storing the flow rate as flow rate data;

(f) executing (a) to (e) at least twice;

(g) setting a delay time corresponding to the flow rate from the stored flow rate data on the basis of a relation between the flow rate and the delay time where the delay time decreases with increase in the flow rate;

(h) judging from a plurality of flow rate data which have been stored, whether the flow rate is increasing or decreasing at present;

(h1) correcting and shortening the delay time according to a value of the flow rate data when the flow rate is increasing;

(h2) correcting and prolonging the delay time according to a value of the flow rate data when the flow rate is decreasing; and (i) repeating (a) to (e) after the lapse of the corrected delay time.

Another method for measuring a flow rate in accordance with the invention comprises:

(a) emitting an ultrasonic wave in a direction which is the same as or opposite to a flow of fluid;

(b) receiving the ultrasonic wave;

(c) determining a propagation time from the emission to the reception of the ultrasonic wave;

(d) determining a flow rate from the propagation time;

(e) storing the flow rate as flow rate data and erasing the oldest flow rate data that has been stored;

(f) resetting the number of repetition from a plurality of stored flow rate data on the basis of a relation between flow rate and delay time in which the number of repetition decreases with increase in the flow rate; and (g) repeating (a) to (f).

Another method for measuring a flow rate in accordance with the invention comprises:

(a) emitting an ultrasonic wave in a direction which is the same as or opposite to a flow of fluid;

(b) receiving the ultrasonic wave;

(c) determining the propagation time from the emission to the reception of the ultrasonic wave;

(d) determining a flow rate from the propagation time;

(e) setting a delay time on the basis of a relationship between time information, such as information on time of day and/or information on month and date, and an amount of the fluid consumed; and (f) repeating (a) to (e) after the lapse of the delay time.

Another method for measuring a flow rate in accordance with the invention comprises:

(a) emitting an ultrasonic wave in a direction which is the same as or opposite to a flow of a fluid;

(b) receiving the ultrasonic wave;

(c) determining a propagation time from the emission to the reception of the ultrasonic wave;

(d) determining a flow rate from the propagation time;

(e) setting a delay time on the basis of the information on a consumption of the fluid; and (f) repeating (a) to (e) after the lapse of the delay time.

An ultrasonic flow meter in accordance with the invention comprises:

(a) a conduit through which a fluid flows;

(b) an ultrasonic-wave generator for emitting an ultrasonic wave into the fluid, the generator being provided in the conduit;

(c) a receiver for receiving the ultrasonic wave, which receiver being provided in the conduit on an upstream or a downstream side of the generator with respect to the flowing direction of the fluid;

(d) a first calculating device operable to determine a propagation time of the ultrasonic wave from the generator to the receiver;

(e) a second calculating device operable to determine a flow rate by the propagation time;

(f) a signal generator operable to generate signals at a time interval corresponding to the flow rate on the basis of a relationship between the flow rate and the time interval where the time interval decreases with increase in the flow rate; and (g) a driving device operable to drive the ultrasonic-wave generator in response to the signals.

Another ultrasonic flow meter in accordance with the invention comprises:

(a) a conduit through which a fluid flows;

(b) an ultrasonic-wave generator for emitting an ultrasonic wave into the fluid, the generator being provided in the conduit;

(c) a receiver for receiving the ultrasonic wave, the receiver being provided in the conduit on the upstream or downstream side of the generator with respect to a flowing direction of the fluid;

(d) a first calculating device operable to determine a propagation time of the ultrasonic wave from the generator to the receiver;

(e) a second calculating device operable to determine a flow rate by the propagation time;

(f) a delay time setting device operable to set a delay time corresponding to the flow rate on the basis of a relationship between the flow rate and the delay time where the delay time decreases generally with increase in the flow rate; and (g) a driving device for driving the ultrasonic-wave generator after the lapse of the delay time.

The relation between flow rates and measuring-time intervals or delay times is set so that the delay time decreases linearly, stepwise, or inversely with increase in the flow rate.

Another ultrasonic flow meter in accordance with the invention comprises:

(a) a conduit through which a fluid flows;

(b) an ultrasonic-wave generator for emitting an ultrasonic wave into the fluid, the generator being provided in the conduit;

(c) a receiver for receiving the ultrasonic wave, the receiver being provided in the conduit on an upstream or a downstream side of the generator with respect to a flowing direction of the fluid;

(d) a first calculating device operable to determine the propagation time of the ultrasonic wave from the generator to the receiver;

(e) a second calculating device operable to determine a flow rate by the propagation time;

(f) a storage device operable to store at least two flow rates determined by the calculating devices, as flow rate data;

(g) a delay time setting operable to set a delay time on the basis of the flow rate data stored in the storage device and on the basis of a relationship between the flow rate and the delay time where the delay time decreases with increase in the flow rate; and (h) a driving device operable to drive the ultrasonic-wave generator and the receiver after the lapse of the delay time.

The storage device, which stores a plurality of flow rate data, preferably erases the oldest flow rate data that has been stored, upon storing new flow rate data, so that a delay time is set on the basis of the mean value of the stored flow rate data.

The ultrasonic flow meter preferably comprises a judging device for judging from a plurality of flow rate data which have been stored whether the flow rate is increasing or decreasing at present, and a correcting device for correcting and shortening the delay time according to a value of the flow rate data when the flow rate is increasing and for correcting and prolonging the delay time according to a value of the flow rate data when the flow rate is decreasing.

Another ultrasonic flow meter in accordance with the invention comprises:

(a) a conduit through which a fluid flows;

(b) a pair of ultrasonic oscillators which are provided in the conduit so that one oscillator is positioned on an upstream side of the other oscillator with respect to a flowing direction of the fluid and each of which is capable of emitting and receiving ultrasonic waves;

(c) a flow rate measuring device operable to determine a flow rate by a propagation time of an ultrasonic wave from the one oscillator to the other oscillator and by the propagation time of an ultrasonic wave from the other oscillator to the one oscillator;

(d) a repeating device operable to repeat a predetermined number of times a switching between a first state where the one oscillator emits the ultrasonic wave and the other oscillator receives the ultrasonic wave and a second state where the other oscillator emits an ultrasonic wave and the one oscillator receives the ultrasonic wave; and (e) a resetting device operable to reset the number of repetition on the basis of the determined flow rate and on the basis of a relationship between the flow rate and the number of repetition where the number of repetition decreases with increase in the flow rate. The number of repetition is set so as to decrease linearly, stepwise, or inversely with increase in the flow rate.

Another ultrasonic flow meter in accordance with the invention comprises:

(a) a conduit through which a fluid flows;

(b) an ultrasonic-wave generator for emitting an ultrasonic wave into the fluid, the generator being provided in the conduit;

(c) a receiver for receiving the ultrasonic wave, the receiver being provided in the conduit on an upstream or a downstream side of the generator with respect to a flowing direction of the fluid;

(d) a first calculating device operable to determine a propagation time of the ultrasonic wave from the generator to the receiver;

(e) a second calculating device operable to determine a flow rate by the propagation time;

(f) an output operable to output at least either of information on year, month, and date and information on time of day;

(g) a setting device operable to set a delay time according to the information from the output device; and (h) a driving device operable to drive the ultrasonic-wave generator and the receiver after the lapse of the delay time.

Another ultrasonic flow meter in accordance with the invention comprises:

(a) a conduit through which a fluid flows;

(b) an ultrasonic-wave generator for emitting an ultrasonic wave into the fluid, the generator being provided in the conduit;

(c) a receiver for receiving the ultrasonic wave, the receiver being provided in the conduit on an upstream or a downstream side of the generator with respect to a flowing direction of the fluid;

(d) a first calculating device operable to determine a propagation time of the ultrasonic wave from the generator to the receiver;

(e) a second calculating device operable to determine a flow rate by the propagation time;

(f) an informing device operable to inform of an operating state of an equipment which consumes the fluid and to which the conduit is connected;

(g) a delay time setting device operable to set a delay time according to the operating state; and (h) a driving device operable to drive the generator and the receiver after the lapse of the delay time.

Another ultrasonic flow meter in accordance with the invention comprises:

(a) a conduit through which a fluid flows;

(b) an ultrasonic-wave generator for emitting an ultrasonic wave into the fluid, the generator being provided on the conduit;

(c) a receiver for receiving the ultrasonic wave, the receiver being provided on the conduit on an upstream or a downstream side of the generator with respect to a flowing direction of the fluid;

(d) a first calculating device operable to determine the propagation time of the ultrasonic wave from the generator to the receiver;

(e) a second calculating device operable to determine a flow rate by the propagation time;

(f) a driving device operable to drive the generator; (g) a storage device operable to store the flow rate determined by the second calculating device, as flow rate data; and (g) (h) a breaker for cutting, for a predetermined period of time, the power to at least any one the first calculating device, the second calculating device, and the driving device when the flow rate data of the flow rate of zero occurs a predetermined number of times in succession.

DETAILED DESCRIPTION OF THE PREFERRED EMBODIMENTS

Figure 1:
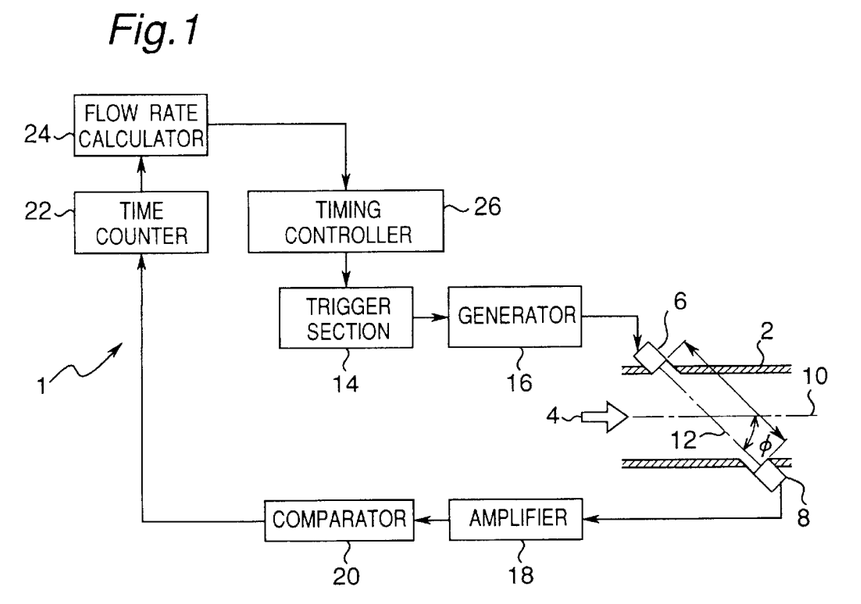
FIG. 1 is a block diagram illustrating a control for an ultrasonic flow meter of a first embodiment.
Figure 2:
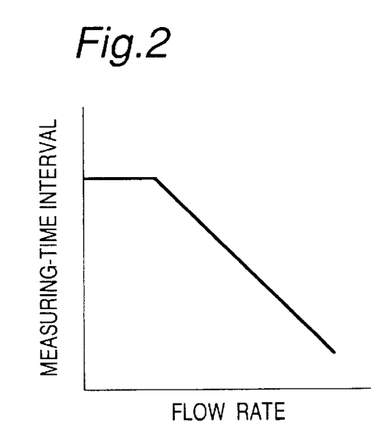
FIG. 2 illustrates a relationship (a characteristic curve) between flow rate and measuring-time interval, wherein the measuring-time interval decreases linearly with increase in the flow rate.

Referring to the drawings, preferred embodiments of the invention will be described. FIG. 1 is a block diagram illustrating a control circuit for an ultrasonic flow meter of the first embodiment in which the ultrasonic flow meter is generally indicated by reference numeral 1. In the flow meter 1, a conduit indicated by reference numeral 2, which is circular in cross section, is connected to a gas burner (not shown), in which a fluid (i.e., gas) to be supplied to the burner flows in a direction indicated by arrow 4. An oscillator indicated by reference numeral 6 is a generator which emits an ultrasonic wave and an oscillator indicated by reference numeral 8 is a receiver which receives the ultrasonic wave emitted from the oscillator 6. The oscillators 6 and 8 are mounted in the conduit 2 so as to confront each other on a line 12 which intersects a central axis 10 of the conduit 2 at a predetermined angle $\phi$. A trigger section indicated by reference numeral 14 outputs a trigger signal at a timing determined by a method which will be described below. A generator indicated by reference numeral 16, upon receiving the trigger signal, outputs a burst signal for energizing the oscillator 6. An amplifier indicated by reference numeral 18 amplifies a signal that the oscillator 8 has emitted when detecting an ultrasonic wave. A comparator indicated by reference numeral 20 generates and then outputs a signal which corresponds to a time (propagation time) from the emission of an ultrasonic wave by the oscillator 6 to the reception of the ultrasonic wave by the oscillator 8. A time counter indicated by reference numeral 22 calculates the propagation time according to the output signal from the comparator 20. A flow rate calculator indicated by reference numeral 24 calculates a flow rate of the fluid flowing in the conduit 2 from the propagation time, according to a calculation which will be described below. A timing controller indicated by reference numeral 26 determines, on the basis of the flow rate, a timing at which the trigger section 14 outputs the trigger signal. In this embodiment, the timing is determined from a measuring-time interval according to a relationship (a characteristic curve) of flow rate versus measuring-time interval, shown in FIG. 2, in which the measuring-time interval decreases linearly with increasing the flow rate.

An operation of the flow meter 1 will be described below. When the trigger signal is transmitted from the trigger section 14, the generator 16 generates and outputs a burst signal based upon the trigger signal. The oscillator 6 is energized by the burst signal to emit the ultrasonic wave toward the oscillator 8. The ultrasonic wave is received by the oscillator 8, and a receiving signal of the oscillator 8 is amplified by the amplifier 18. The comparator 20 then generates a signal which corresponds to the propagation time of the ultrasonic wave and outputs the signal to the time counter 22. The time counter 22 calculates the propagation time and then the flow rate calculator 24 calculates the flow rate from the propagation time. Subsequently, the timing controller 26 then determines a measuring-time interval corresponding to the determined flow rate on the basis of the relationship shown in FIG. 2. Specifically, the measuring-time interval is set shorter if the flow rate measured at the present time is larger than the flow rate measured at the last time, while the measuring-time interval is set longer if the flow rate has become smaller. Then, the trigger section 14 outputs a trigger signal, at the measuring-time interval which has been newly set, to energize the oscillator 6 to emit the ultrasonic wave. The ultrasonic wave is detected by the oscillator 8 and the flow rate is measured. After that, the above-described process is repeated.

According to the invention, the flow rate is measured more frequently as it increases, and therefore it is possible to determined a cumulative value of the flow rates in an apparatus like a gas-meter which is required to determined the cumulative value with greater presicion, in spite of the fact that measurement errors in the flow rate provide a great influence on the cumulative value.

The calculation of the propagation time in the time counter 22 will be described below. Assume that a velocity at which an ultrasonic wave propagates in a fluid at rest is (c) and that a velocity of the fluid is (v), a propagation velocity of the ultrasonic wave in a direction along which the fluid flows is (c+v). The propagation time (t) of the ultrasonic wave from the oscillator 6 to the oscillator 8 is given by the following equation (1):

$$t = L/(c + v \cdot \cos \phi) \quad (1)$$

In the equation (1), (L) is a distance between the oscillators 6 and 8.

The equation (1) can be transformed into the following equation (2):

$$v = (L/c - c)/\cos \phi. \quad (2)$$

According to this equation, the flow velocity can be determined by measuring the propagation time t because L and c are known. The flow rate (Q) on the other hand is given by the following equation (3):

$$Q = K \cdot S \cdot v \quad (3)$$

In the equation (3), (S) is the cross-sectional area of the conduit 2, and (K) is the correction coefficient.

Figure 3:
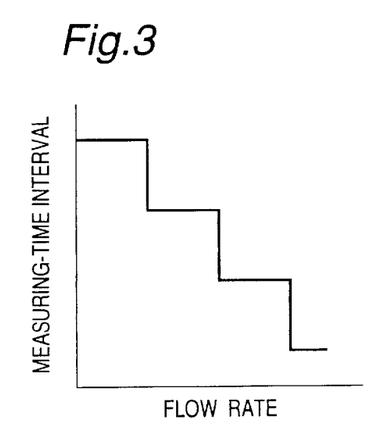
FIG. 3 illustrates another relationship (a characteristic curve) between flow rate and measuring-time interval, wherein the measuring-time interval decreases stepwise with increase in the flow rate.
Figures 4, 5:
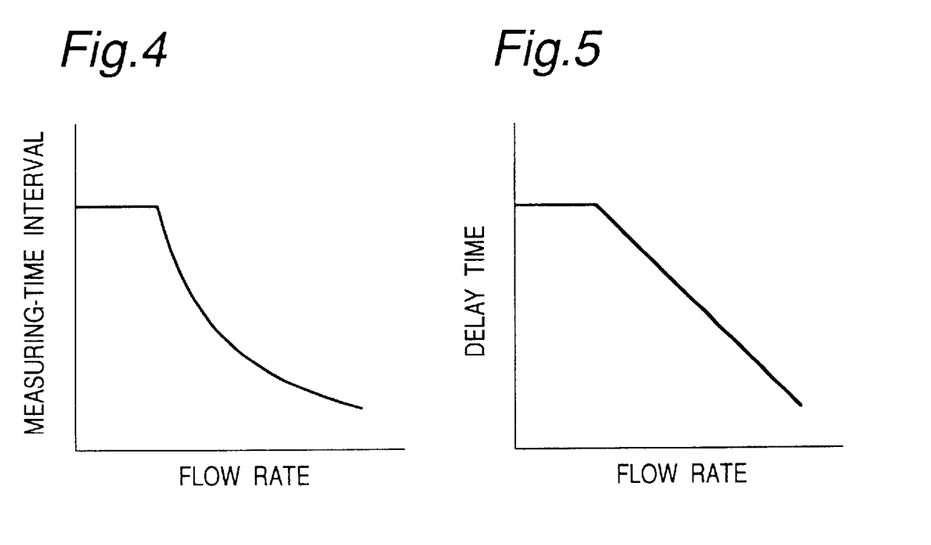
FIG. 4 illustrates another relation (a characteristic curve) between flow rate and measuring-time interval, wherein the measuring-time interval decreases in inverse proportion to the increasing flow rate.
FIG. 5 illustrates a relation (a characteristic curve) between flow rate and delay time, wherein the delay time decreases linearly with increase in the flow rate.

The relationship between flow rate and measuring-time interval may be such that the measuring-time interval decreases stepwise with the increasing flow rate, as shown in FIG. 3, or may be such that the measuring-time interval is inversely proportional to the flow rate, as shown in FIG. 4.

In the first embodiment, although the measuring-time interval is determined at the timing controller 26 from the measured flow rate on the basis of a predetermined relationship between flow rate and measuring-time interval; a delay time of the trigger signal to be outputted from the trigger section 14 may be determined from the measured flow rate so that the trigger section 14 is energized after the lapse of the delay time.

Figures 6, 7:
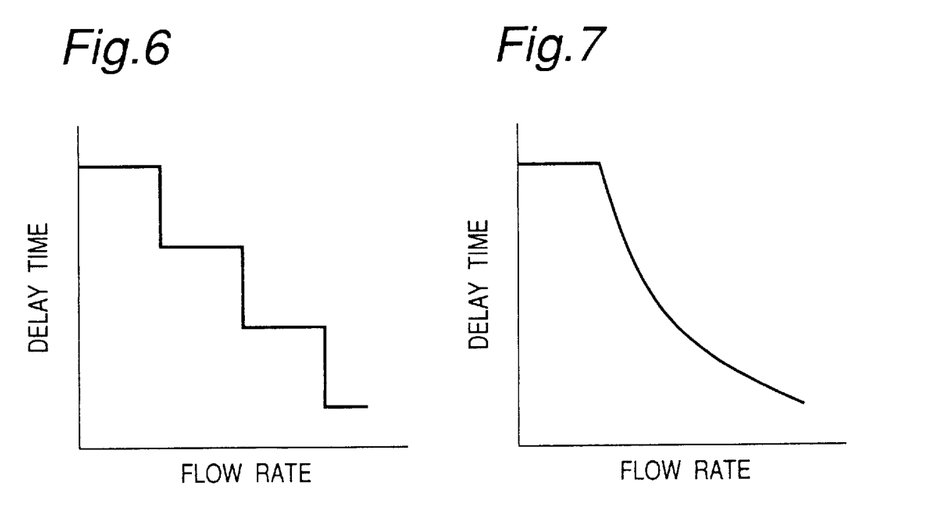
FIG. 6 illustrates another relationship (a characteristic curve) between flow rate and delay time, wherein the delay time decreases stepwise with increase in the flow rate.
FIG. 7 illustrates another relation (a characteristic curve) between flow rate and delay time, wherein the delay time decreases in inverse proportion to the increasing flow rate.

The relationship between flow rate and delay time may be any one of a linear relation (FIG. 5), a stepwise relation (FIG. 6), and an inverse relation (FIG. 7), as far as the delay time generally decreases with the increasing flow rate.

SECOND EMBODIMENT

Figure 8:
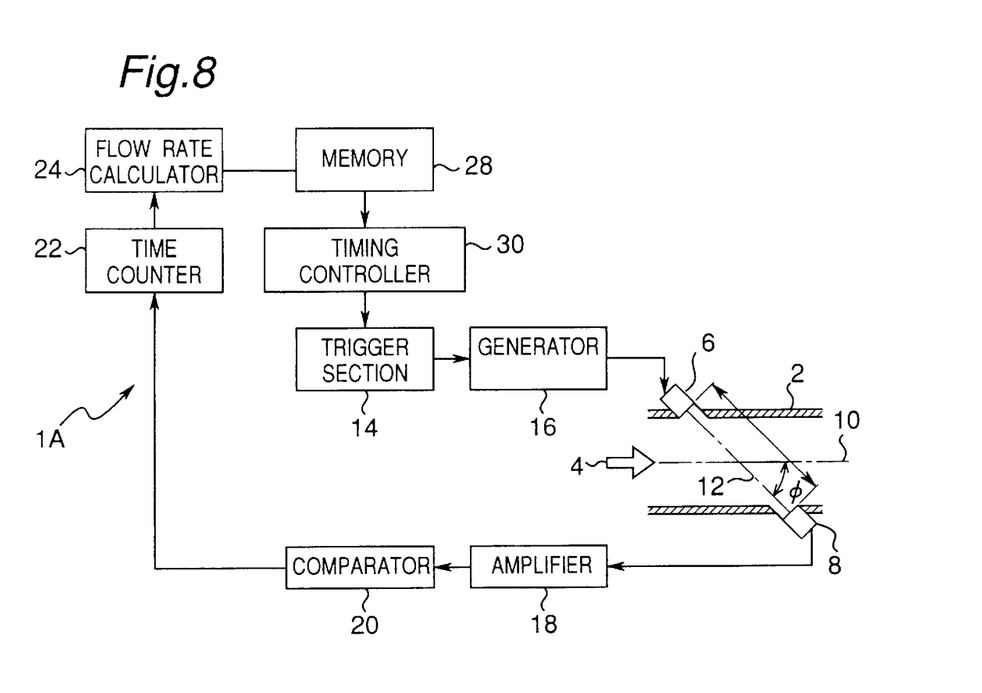
FIG. 8 is a block diagram illustrating a control for the ultrasonic flow meter of a second embodiment.

FIG. 8 illustrates an ultrasonic flow meter 1A of the second embodiment, which includes many elements in common with the ultrasonic flow meter of FIG. 1, and like elements are designated by like reference numerals because like elements achieve similar functions, respectively. To the ultrasonic flow meter 1A, however, added is a storing section 28 for storing flow rate data. In the storing section 28, a predetermined number of flow rate values calculated by the flow rate calculator 24 are sequentially stored as flow rate data, and the data is updated by replacing the oldest flow rate data with the newest flow rate data. On the basis of the mean value of the plurality of stored flow rate data, the measuring-time interval or the delay time is set at the timing controller 30 according to any one of the relationships of FIGS. 2 to 4 or of FIGS. 5 to 7, respectively.

Figure 9:
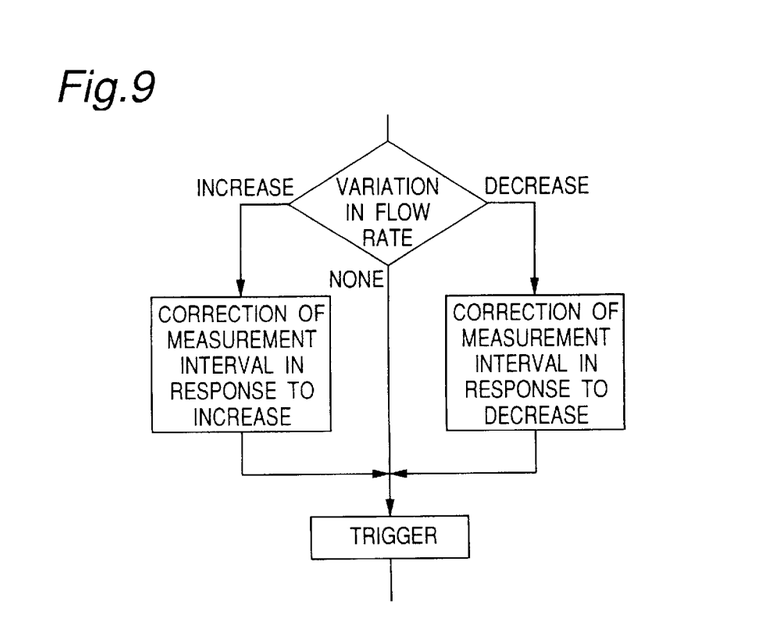
FIG. 9 is a part of a flow chart illustrating the control for the ultrasonic flow meter in FIG. 8.
Figure 10:
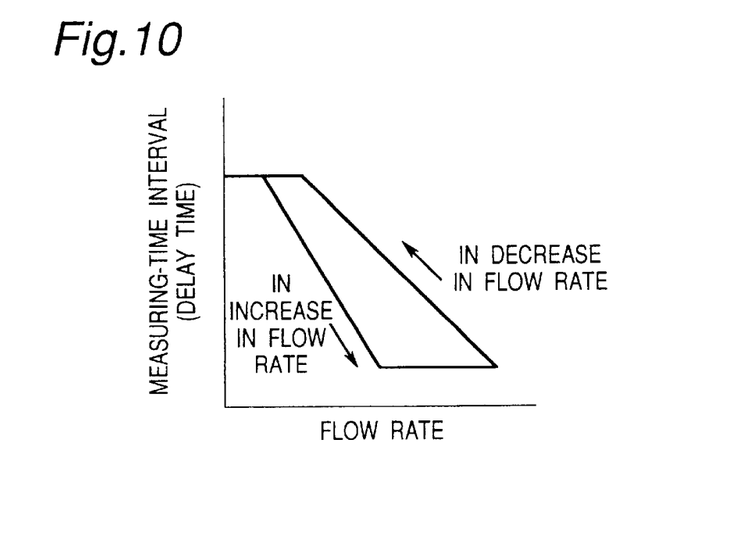
FIG. 10 illustrates a relationship (a characteristic curve) between flow rate and the measuring-time interval (and the delay times) corrected in response to the state of increase or decrease in the flow rate.

The relationships between flow rate and measuring-time interval and flow rate and delay time are preferably corrected with consideration to whether the flow rate is increasing or decreasing at present. For example, as shown in the flow chart of FIG. 9, the timing controller 30 judges from the flow rate data stored in the storing section 28 whether the flow rate is increasing or decreasing at present. When the flow rate is increasing, the measuring-time interval and the delay time are corrected to be shorter than those of which to be set with respect to the same flow rate when the flow rate is stable; when the flow rate is decreasing the measuring-time interval and, the delay time is corrected to be longer. Subsequently, a trigger signal is outputted on the basis of the measuring-time interval or the delay time which has been thus corrected. The relationship between flow rate and measuring-time interval or delay time which has been corrected in this way is shown in FIG. 10. Such a correction of flow rate has an advantage that the increase in flow rate can be accurately measured, for example, even in the case that the flow rate increases sharply.

THIRD EMBODIMENT

Figure 11:
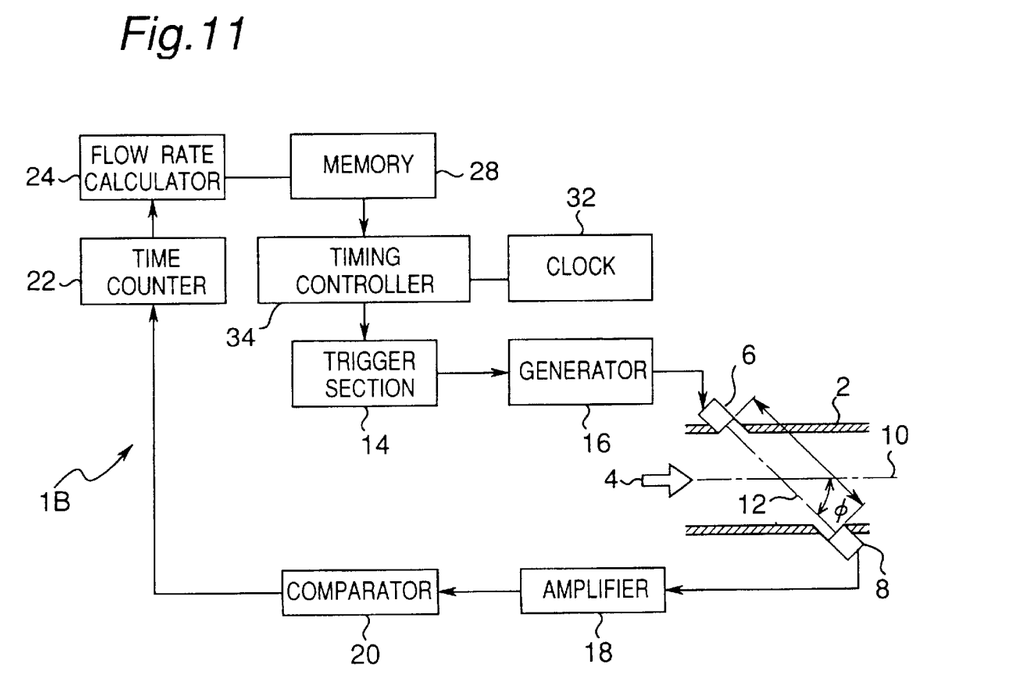
FIG. 11 is a block diagram illustrating a control for the ultrasonic flow meter of a third embodiment.
Figure 12:
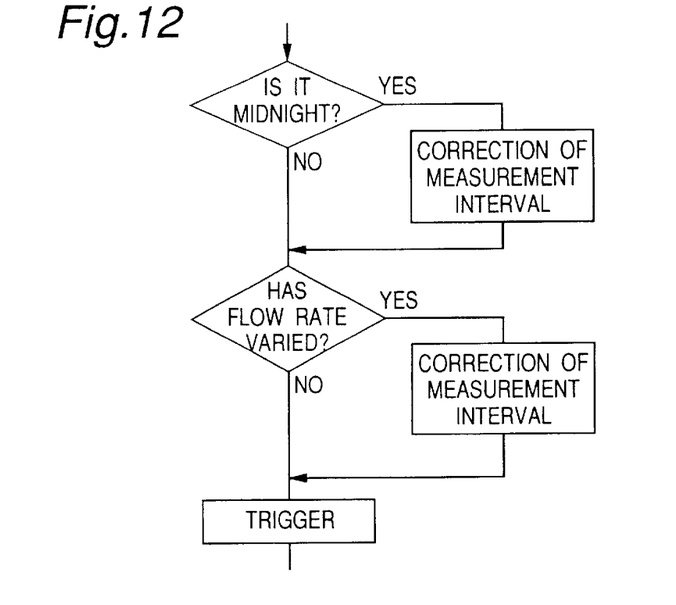
FIG. 12 is a part of a flow chart illustrating the control for the ultrasonic flow meter in FIG. 11.

FIG. 11 illustrates an ultrasonic flow meter 1B of a third embodiment, which meter 1B has many elements in common with the ultrasonic flow meter shown in FIG. 1, and like elements are designated by like reference numerals because like elements achieve similar functions, respectively. To the ultrasonic flow meter 1B, a function is added by which the measuring-time interval and the delay time are changed depending upon whether it is a time zone in which gas is typically consumed or not. Specifically, the ultrasonic flow meter 1B comprises a clock 32, and the present time outputted from the clock 32 is delivered to a timing controller 34. As shown in the flow chart of FIG. 12, the timing controller 34 judges from the time information whether or not it is in the hours when gas is consumed in large quantities. For example, a midnight time zone from twelve o'clock midnight to five o'clock in the morning is set as a low gas-consumption time zone and the rest is set as a high gas-consumption time zone, and a determination is made whether it is in the low or high gas consumption time zone at present. When it is judged that the present time belongs to the low gas-consumption hours, the measuring-time interval (or the delay time) is set at a predetermined longer period of time. The measuring-time interval or the delay time which is set at this stage is different from and independent of the time determined by a flow rate on the basis of one of the relationships shown in FIGS. 2 to 4 (or FIGS. 5 to 7). Subsequently, whether the flow rate has varied or not is judged; if the flow rate has varied, the measuring-time interval or the delay time is newly set according to the flow rate newly measured on the basis of one of the relationships shown in FIGS. 2 to 4, or FIGS. 5 to 7, respectively.

In accordance with the embodiment, an unnecessary power consumption can be reduced by setting the measuring-time interval or the delay time longer in the midnight hours when gas is not used. However, if the gas is consumed in midnight, the flow rate is measured at certain measuring-time intervals or with time delays corresponding to the flow rates.

In an area where the amount of consumption of a fluid such as gas varies depending upon seasons, the information on month and date, instead of or along with the information on time of day, may be outputted from the clock and referred to for controlling the measurement of flow rates.

FOURTH EMBODIMENT

Figure 13:
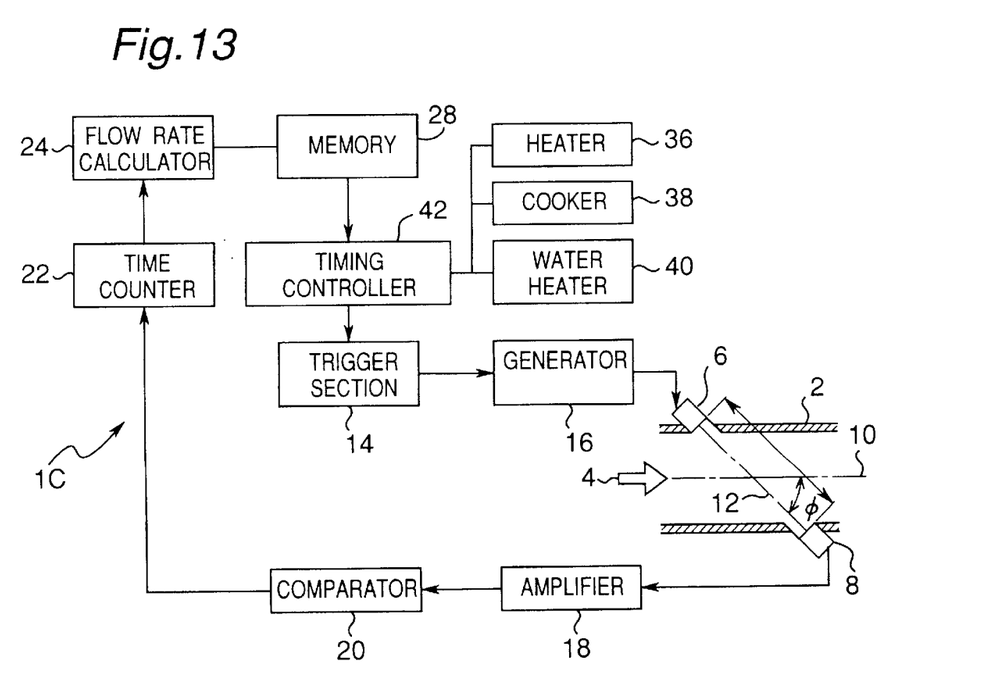
FIG. 13 is a block diagram illustrating a control for the ultrasonic flow meter of a fourth embodiment.
Figure 14:
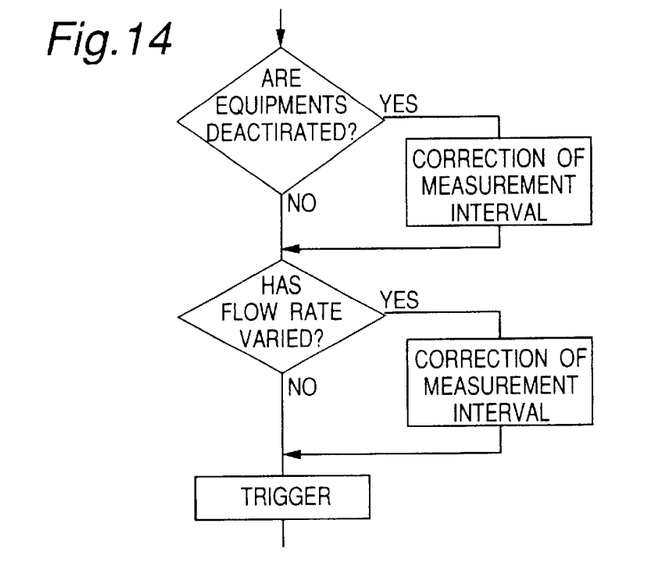
FIG. 14 is a part of a flow chart illustrating the control for the ultrasonic flow meter in FIG. 13.

FIG. 13 illustrates an ultrasonic flow meter 1C of a fourth embodiment, which meter 1C has many elements in common with the ultrasonic flow meter shown in FIG. 1, and like elements are designated by like reference numeral because like elements achieve similar functions, respectively. In the ultrasonic flow meter 1C, operating states of equipments in which gas is consumed, for example, a heater 36, a stove 38, and a hot-water supply 40, are inputted into a timing controller 42. As shown in the flow chart of FIG. 14, the timing controller 42 judges whether the gas-consuming equipment 36, 38, or 40 is deactivated or not. When it is judged that all the gas-consuming equipments are deactivated, the measuring-time interval (or the delay time) is set to a predetermined longer period of time. The measuring-time interval (or the delay time) which is set in this way is different from and independent of the time determined according to a flow rate on the basis of one of the relationship shown in FIGS. 2 to 4 (or FIGS. 5 to 7). Subsequently, whether the flow rate has varied or not is judged, and if the flow rate has varied, a measuring-time interval or a delay time is newly set from a flow rate newly measured on the basis of one of the relationship shown in FIGS. 2 to 4 or FIGS. 5 to 7, respectively. In accordance with the embodiment, an unnecessary power consumption can be reduced by setting the measuring-time interval or the delay time longer when gas is not consumed.

FIFTH EMBODIMENT

Figure 15:
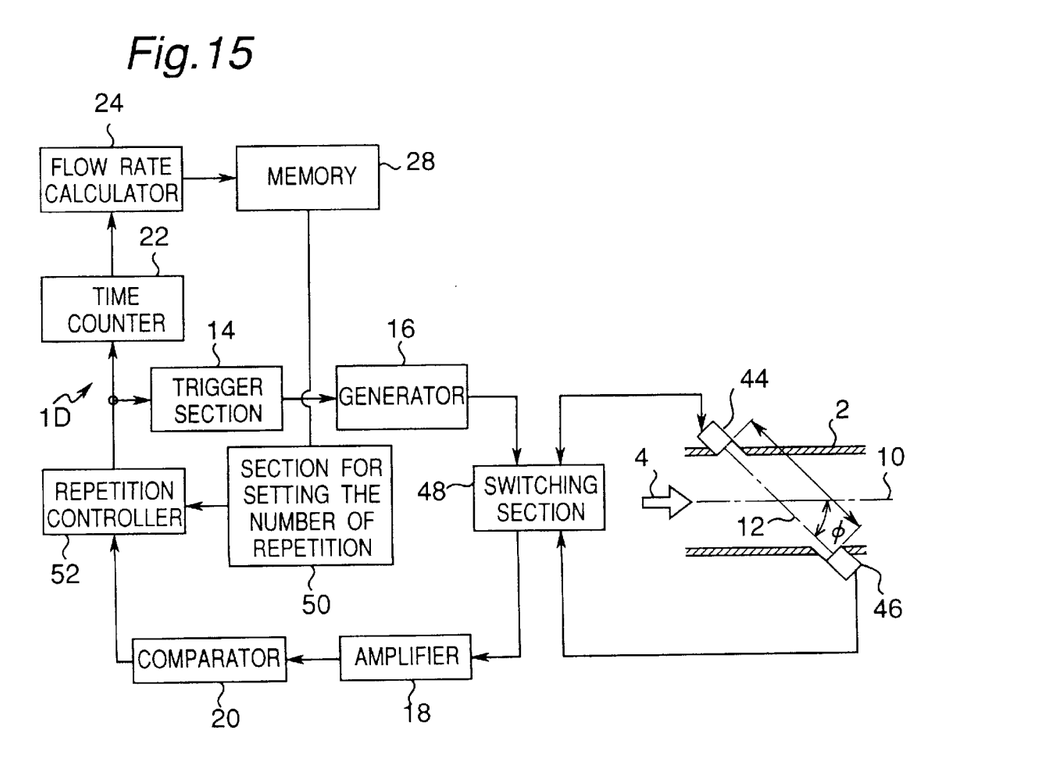
FIG. 15 is a block diagram illustrating a control for the ultrasonic flow meter of a fifth embodiment.

FIG. 15 illustrates an ultrasonic flow meter 1D of a fifth embodiment, which meter 1D has many elements in common with the ultrasonic flow meter shown in FIG. 1, and like elements are designated by like reference numerals because like elements achieve similar functions, respectively. In the ultrasonic flow meter 1D, oscillators 44 and 46 which have both the functions of emitting and receiving ultrasonic waves are mounted in the conduit 2 so as to oppose each other on a line 12 which intersects the central axis 10 of the conduit 2 at a predetermined angle φ. An oscillator-switching section 48 alternately switches the oscillators between one state for emitting ultrasonic waves and the other state for receiving ultrasonic waves. A repetition-setting section 50 sets the number of times the oscillators 44 and 46 repeat the emission of an ultrasonic wave. A repetition controller 52 switches a first state where one oscillator 44 emits the ultrasonic wave the number of times corresponding to a flow rate and the other oscillator 46 receives the ultrasonic wave, to a second state where the other oscillator 46 emits the ultrasonic wave the same number of times and the one oscillator 44 receives the ultrasonic wave, and vice versa. The relationship between flow rate and the number of repetition is set so that the number of repetition generally decreases with increasing flow rate.

Figure 16:
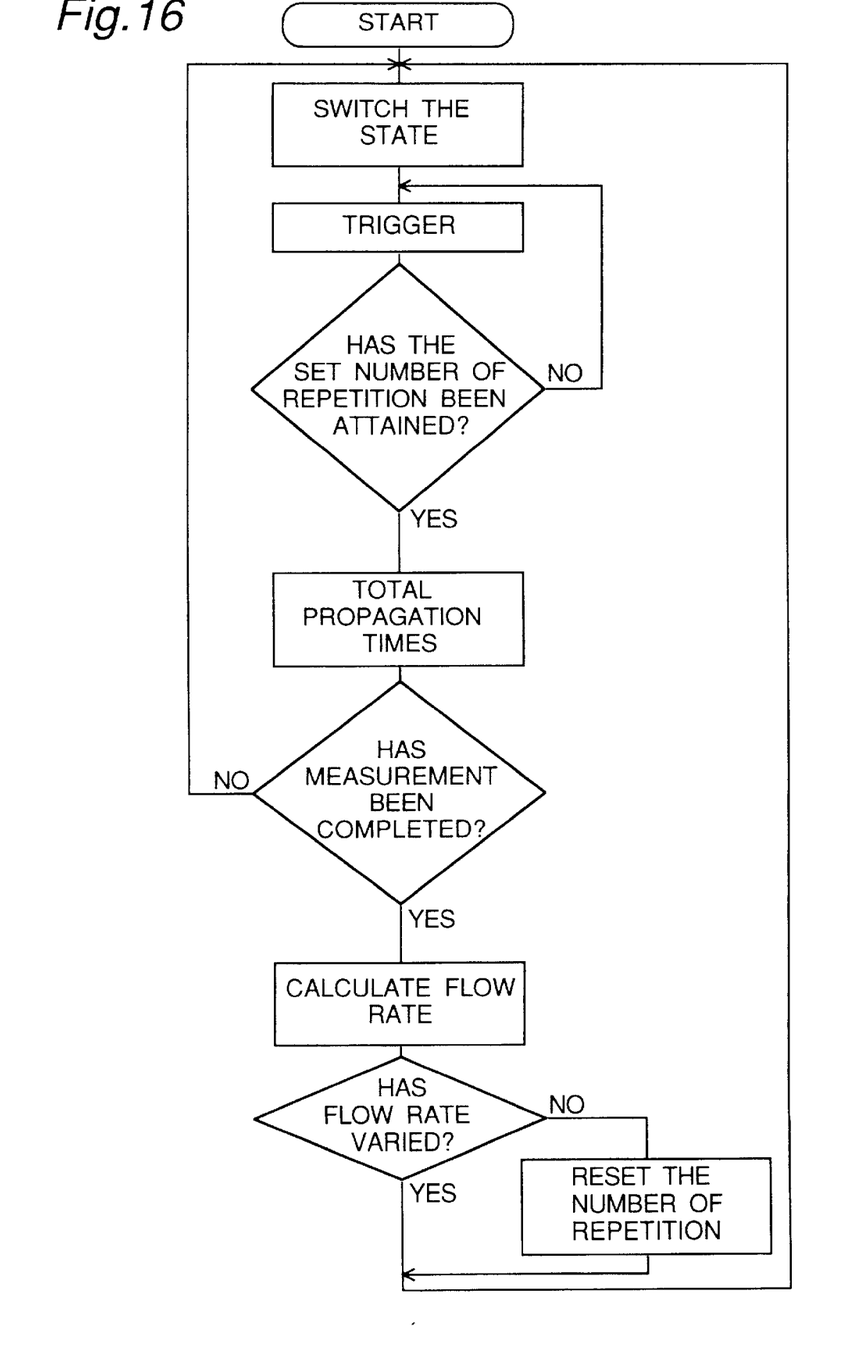
FIG. 16 is a flow chart illustrating the control for the ultrasonic flow meter in FIG. 15.

The operation of the flow meter 1D mentioned above will be specifically described below with reference to a flow chart shown in FIG. 16. Assume that the number of repetition is set at (n) by the repetition-setting section 50, the first state is established by the switching section 48. After that, a trigger signal is outputted from the trigger section 14 and the burst signal is outputted from the generator 16. An ultrasonic wave is thereby emitted from the oscillator 44 toward the other oscillator 46 with a predetermined delay time. A signal received by the oscillator 46 is amplified in the amplifier 18 and compared with a reference signal in the comparator 20. The propagation time of the ultrasonic wave is then calculated by the time counter 22. Subsequently, whether or not an ultrasonic wave has been emitted (n) times from the oscillator 44 is judged. If the ultrasonic wave has been emitted (n) times, the propagation times of the ultrasonic waves emitted (n) times are totaled by the time counter. If the ultrasonic wave has been emitted fewer than (n) times, on the other hand, another trigger signal is outputted again from the trigger section 14 to execute the emission and reception of an ultrasonic wave.

When the measurement in the first state is completed, the oscillator-switching section 48 is switched into the second state. Thus the operation in which an ultrasonic wave is emitted from the oscillator 46 and received by the other oscillator 44 is repeated (n) times, and then the propagation times of the ultrasonic waves emitted (n) times are totaled.

Subsequently, the flow rate is determined on the basis of the totals or averages of the propagation times in the first state and in the second state. Whether the flow rate has increased or decreased is then judged by comparing the flow rate newly measured with the flow rate measured last time, and the number of repetition corresponding to the flow rate newly measured is set in the section 50 for setting the number of repetition. The number of repetition set in this way is such that the number of repetition generally decreases with increase in flow rate, and therefore, even a low flow rate can be accurately measured.

The calculation of a flow velocity and a flow rate in the embodiment will be described below. Assuming the velocity (c) of the ultrasonic wave in a fluid at rest and the flow velocity (v) of the fluid, the propagation velocity of the ultrasonic wave in the direction of the flow is given as (c+v), and the propagation velocity of the ultrasonic wave in the direction opposed to the flow direction is given as (c−v). The total T1 of the propagation times in the flow direction and the total T2 of the propagation times in the direction opposed to the flow direction are given by equations (4) and (5), respectively.

$$T1 = \sum_{i=1}^{n} L/(c - v_i \cdot \cos\varphi) \qquad (4)$$

$$T2 = \sum_{i=1}^{n} L/(c - v_i \cdot \cos\varphi) \qquad (5)$$

In the equations (4) and (5), $\phi$ is an intersectional angle between the central axis of the conduit and the line connecting the oscillators, and n is the number of repetition.

In accordance with the equations (4) and (5), the total of the measurements of the flow velocities is given by an equation (6) below:

$$(v1+\ldots+v_n) = L \cdot n \cdot (1/T1 - 1/T2)/2 \cdot \cos\phi \qquad (6)$$

In accordance with the equation (6), the total of the flow velocities is given by an equation (7) below:

$$\Sigma Qn = K \cdot S \cdot (v_1 + \ldots + v_n) \qquad (7)$$

In the equation (7), $\Sigma Qn$, (K), and (S) represent the total of the flow velocities, a correction coefficient, and the cross-sectional area of the conduit, respectively.

As is evident from the equations (6) and (7), the total of the flow rate values increases with increase in the number of times of the measurement. In other words, even in the case of a low flow velocity, increasing the number of times of the measurement causes the totals of the flow velocity values and the flow rate values to increase, thus making an error included in each measurement relatively small. In the case of a high flow velocity, on the contrary, even decreasing the number of times of the measurement permits a relative measurement error to remain small because the difference between T1 and T2 is large.

In the invention, for this reason, the repetition-setting section 50 sets the number of repetition at a large number in the case of a low flow rate, while the section 50 sets the number of repetition at a small number in the case of a high flow rate. The relation between the flow rates and the numbers of repetition has only to be such that the number of repetition generally decreases with increase in the flow rate, and the relation is set so that the number of repetition decreases linearly, stepwise, or inversely with increase in the flow rate.

It has been described that one oscillator emits the ultrasonic wave (n) times and then the other oscillator emits the ultrasonic wave (n) times; however, an operation in which one oscillator emits the ultrasonic wave once and then the other oscillator emits the ultrasonic wave once may be executed as many times as the number of repetition.

SIXTH EMBODIMENT

Figure 17:
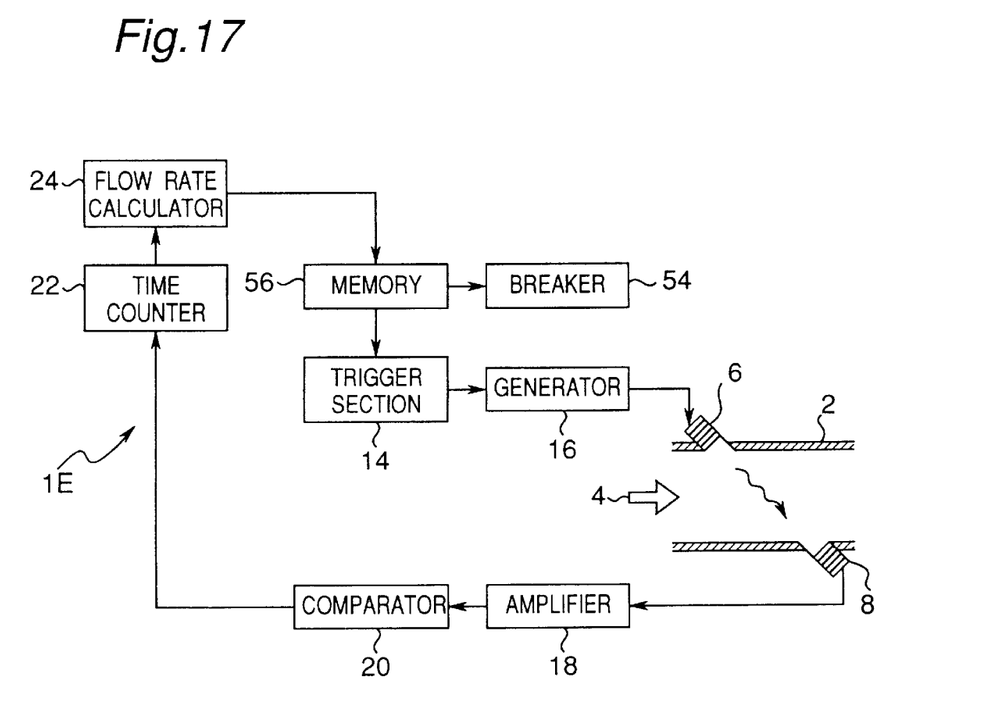
FIG. 17 is a block diagram illustrating a control for the ultrasonic flow meter of a sixth embodiment.
Figure 18:
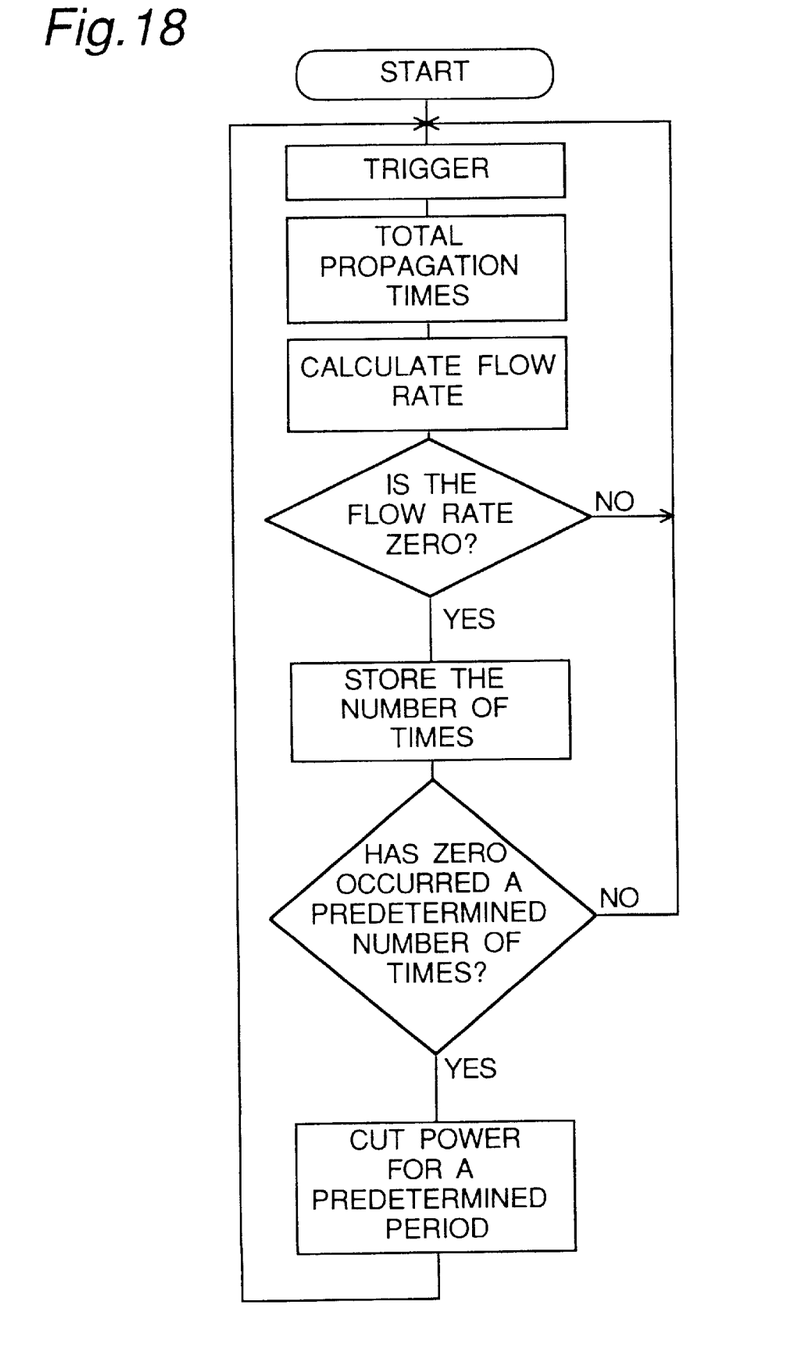
FIG. 18 is a flow chart illustrating the control for the ultrasonic flow meter of FIG. 17.

FIG. 17 illustrates an ultrasonic flow meter 1E of a sixth embodiment, which meter 1E has many elements in common with the ultrasonic flow meter shown in FIG. 1; and like elements are designed by like numerals because like elements achieve similar functions, respectively. The flow meter 1E comprises a breaker 54 and, as shown in the flow chart of FIG. 18, a plurality of flow rate values calculated in a flow rate calculator 24 are stored in a memory 56 as flow rate data. When the flow rate is judged to be zero from the flow rate data in the memory 56, the number of times the rate has been successively judged to be zero is stored. In the case that the flow rate has been judged to be zero a predetermined number of times in succession, the breaker 54 is driven to cut for a predetermined period of time at least one of the powers of the trigger section, the generator 16, the amplifier 18, the comparator 20, the time counter 22, and the flow rate calculator 24. As long as a fluid does not flow, therefore, the measuring-time intervals are made long so that the power consumption can be saved.

We claim:

1. A method for measuring a flow rate, said method comprising:
   (a) emitting an ultrasonic wave in a direction which is the same as or opposite to a flow of fluid;
   (b) receiving the ultrasonic wave;
   (c) determining a propagation time from emission of the ultrasonic wave to reception of the ultrasonic wave;
   (d) determining a flow rate based on the propagation time;
   (e) setting a delay time corresponding to the flow rate based on a flow rate to delay time relationship, wherein the flow rate to delay time relationship is characterized in that the delay time decreases with increase in flow rate; and
   (f) repeating (a) to (e) after the delay time has elapsed.

2. A method for measuring a flow rate as claimed in claim 1, wherein, in the flow rate to delay time relationship, the delay time decreases inversely with increase in flow rate.

3. A method for measuring a flow rate as claimed in claim 1, wherein, in the flow rate to delay time relationship, the delay time decreases linearly with increase in flow rate.

4. A method for measuring a flow rate as claimed in claim 1, wherein, in the flow rate to delay time relationship, the delay time decreases stepwise with increase in flow rate.

5. A method for measuring a flow rate, said method comprising:
   (a) emitting an ultrasonic wave in a direction which is the same as or opposite to a flow of fluid;
   (b) receiving the ultrasonic wave;
   (c) determining a propagation time from emission of the ultrasonic wave to reception of the ultrasonic wave;
   (d) determining a flow rate based on the propagation time;
   (e) storing the flow rate as flow rate data;
   (f) executing (a) to (e) at least twice;
   (g) setting a delay time corresponding to the flow rate from the stored flow rate data based on a flow rate to delay time relationship, wherein the flow rate to delay time relationship is characterized in that the delay time decreases with increase in flow rate; and
   (h) repeating (a) to (e) after the delay time has elapsed.

6. A method for measuring a flow rate, said method comprising:
   (a) emitting an ultrasonic wave in a direction which is the same as or opposite to a flow of fluid;
   (b) receiving the ultrasonic wave;
   (c) determining a propagation time from emission of the ultrasonic wave to reception of the ultrasonic wave;
   (d) determining a flow rate based on the propagation time;
   (e) storing the flow rate as flow rate data;
   (f) executing (a) to (e) at least twice;
   (g) setting a delay time corresponding to the flow rate from the stored flow rate data based on a flow rate to delay time relationship, wherein the flow rate to delay time relationship is characterized in that the delay time decreases with increase in flow rate;

(h) judging from a plurality of flow rate data which have been stored, whether the flow rate is increasing or decreasing at present time;
  (h1) correcting and shortening the delay time according to a value of the flow rate data when the flow rate is increasing;
  (h2) correcting and prolonging the delay time according to a value of the flow rate data when the flow rate is decreasing; and
(i) repeating (a) to (e) after the corrected delay time has elapsed.

7. A method for measuring a flow rate, said method comprising:
  (a) emitting an ultrasonic wave in a direction which is the same as or opposite to a flow of fluid;
  (b) receiving the ultrasonic wave;
  (c) determining a propagation time from emission of the ultrasonic wave to reception of the ultrasonic wave;
  (d) determining a flow rate based on the propagation time;
  (e) storing the flow rate as flow rate data and erasing an oldest flow rate data that has been stored;
  (f) resetting a repetition number, indicative of a number of times an ultrasonic wave is to be emitted for a given flow rate, based on a plurality of stored flow rate data and based on a flow rate to repetition number relationship, wherein the flow rate is repetition number relationship is characterized in that the repetition number decreases with increase in flow rate; and
  (g) repeating (a) to (f).

8. A method for measuring a flow rate, said method comprising:
  (a) setting a delay time on the basis of a relationship between time information and an amount of a fluid consumed;
  (b) emitting an ultrasonic wave in a direction which is the same as or opposite to a flow of the fluid;
  (c) receiving the ultrasonic wave;
  (d) determining a propagation time from emission of the ultrasonic wave to reception of the ultrasonic wave;
  (e) determining a flow rate on the basis of the propagation time;
  (f) adjusting the delay time based on the flow rate, wherein the delay time decreases with increase in flow rate; and
  (g) repeating (b) to (f) after the delay time has elapsed.

9. A method for measuring a flow rate as claimed in claim 8, wherein the time information is information indicative of time of day.

10. A method for measuring a flow rate as claimed in claim 8, wherein the time information is information indicative of year, month, and date.

11. A method for measuring a flow rate, said method comprising:
  (a) setting a delay time based on information indicative of a consumption of a fluid;
  (b) emitting an ultrasonic wave in a direction which is the same as or opposite to a flow of the fluid;
  (c) receiving the ultrasonic wave;
  (d) determining a propagation time from emission of the ultrasonic wave to reception of the ultrasonic wave;
  (e) determining a flow rate on the basis of the propagation time;
  (f) adjusting the delay time based on the flow rate, wherein the delay time decreases with increase in flow rate; and
  (g) repeating (b) to (f) after the delay time has elapsed.

12. An ultrasonic flow meter comprising:
  a conduit through which a fluid is to flow;
  an ultrasonic wave generator, provided in said conduit, operable to emit an ultrasonic wave into the fluid;
  a receiver provided in said conduit on an upstream or a downstream side of said ultrasonic wave generator with respect to a flowing direction of the fluid; operable to receive the ultrasonic wave;
  a first calculating device operable to determine a propagation time of the ultrasonic wave from said ultrasonic wave generator to said receiver;
  a second calculating device operable to determine a flow rate based on the propagation time;
  a signal generator operable to generate a signal at a time interval corresponding to the flow rate based on a flow rate to time interval relationship, wherein the flow rate to time interval relationship is characterized in that the time interval decreases with increase in flow rate; and
  a driving device operable to drive said ultrasonic wave generator in response to the signal.

13. An ultrasonic flow meter comprising:
  a conduit through which a fluid is to flow;
  an ultrasonic wave generator, provided in said conduit, operable to emit an ultrasonic wave into the fluid;
  a receiver provided in said conduit on an upstream or downstream side of said ultrasonic wave generator with respect to a flowing direction of the fluid, operable to receive the ultrasonic wave;
  a first calculating device operable to determine a propagation time of the ultrasonic wave from said ultrasonic wave generator to said receiver;
  a second calculating device operable to determine a flow rate based on the propagation time;
  a delay time setting device operable to set a delay time corresponding to the flow rate based on a flow rate to delay time relationship, wherein the flow rate to delay time relationship is characterized in that the delay time decreases with increase in flow rate; and
  a driving device operable to drive said ultrasonic wave generator after the delay time has elapsed.

14. An ultrasonic flow meter as claimed in claim 13, wherein, in the flow rate to delay time relationship, the delay time decreases inversely with increase in flow rate.

15. An ultrasonic flow meter as claimed in claim 13, wherein, in the flow rate to delay time relationship, the delay time decreases linearly with increase in flow rate.

16. An ultrasonic flow meter as claimed in claim 13, wherein, in the flow rate to delay time relationship, the delay time decreases stepwise with increase in flow rate.

17. An ultrasonic flow meter comprising:
  a conduit through which a fluid is to flow;
  an ultrasonic wave generator, provided in said conduit, operable to emit an ultrasonic wave into the fluid;
  a receiver provided in said conduit on an upstream or a downstream side of said ultrasonic wave generator with respect to a flowing direction of the fluid, operable to receive the ultrasonic wave;
  a first calculating device operable to determine a propagation time of the ultrasonic wave from said ultrasonic wave generator to said receiver;
  a second calculating device operable to determine a flow rate based on the propagation time;
  a storage device operable to store at least two flow rates determined by said second calculating device, as flow rate data;
  a delay time setting device operable to set a delay time based on the flow rate data stored in said storage device and based on a flow rate to delay time relationship, wherein the flow rate to delay time relationship is characterized in that the delay time decreases with increase inflow rate; and a driving device operable to drive said ultrasonic wave generator and said receiver after the delay time has elapsed.

18. An ultrasonic flow meter as claimed in claim 17, wherein said storage device is operable to store a plurality of flow rate data and to erase an oldest flow rate data that has been previously stored upon storing new flow rate data, so that the delay time is set based on a mean value of the stored flow rate data.

19. An ultrasonic flow meter as claimed in claim 17, further comprising:

a judging device operable to judge, from a plurality of flow rate data which have been previously stored, whether the flow rates is increasing or decreasing at present; and a correcting device operable to correct and shorten the delay time according to a value of the flow rate data when the flow rate is increasing and to correct and prolong the delay time according to a value of the flow rate data when the flow rate is decreasing.

20. An ultrasonic flow meter comprising:

a conduit through which a fluid is to flow;

a pair of ultrasonic oscillators provided in said conduit such that one oscillator is positioned on an upstream side of the other oscillator with respect to a flowing direction of the fluid, wherein each of said ultrasonic oscillators is capable of emitting and receiving ultrasonic waves;

a flow rate measuring device operable to determine a flow rate based on a propagation time of an ultrasonic wave from the one oscillator to the other oscillator and based on the propagation time of an ultrasonic wave from the other oscillator to the one oscillator;

a repeating device operable to repeat, for a determined number of times, a switching between a first state where the one oscillator emits the ultrasonic wave and the other oscillator received the ultrasonic wave and a second state where the other oscillator emits an ultrasonic wave and the one oscillator receives the ultrasonic wave; and a resetting device operable to reset the determined number based on the flow rate determined by said flow rate measuring device based on a flow rate to determined number relationship, wherein the flow rate to determined number relationship is characterized in that the determined number decreases with increase in flow rate.

21. An ultrasonic flow meter as claimed in claim 20, wherein, in the flow rate to determined number relationship, the determined number decreases inversely with increase in flow rate.

22. An ultrasonic flow meter as claimed in claim 20, wherein, in the flow rate determined number relationship, the determined number decreases linearly with increase in flow rate.

23. An ultrasonic flow meter as claimed in claim 20, wherein, in the flow rate to determined number relationship relation, the determined number decreases stepwise with increase in flow rate.

24. An ultrasonic flow meter comprising:

a conduit through which a fluid is to flow;

an ultrasonic-wave generator, provided in said conduit, operable to emit an ultrasonic wave into the fluid;

a receiver provided in said conduit on an upstream or a downstream side of said ultrasonic wave generator with respect to a flowing direction of the fluid, operable to receive the ultrasonic wave;

a first calculating device operable to determine a propagation time of the ultrasonic wave from said ultrasonic wave generator to said receiver;

a second calculating device operable to determine a flow rate based on the propagation time;

an output device operable to output at least either of information indicative of year, month, and date and information indicative of time of day;

a delay time setting device operable to set a delay time according to the information from said output device and operable to change the delay time, wherein the delay time is decreased when the flow rate increases; and a driving device operable to drive said ultrasonic wave generator and said receiver after the delay time has elapsed.

25. An ultrasonic flow meter for use with fluid and equipment which consumes the fluid, said meter comprising:

a conduit through which a fluid is to flow;

an ultrasonic wave generator, provided in said conduit, operable to emit an ultrasonic wave into the fluid;

a receiver provided in said conduit on an upstream or a downstream side of said ultrasonic wave generator with respect to a flowing direction of the fluid, operable to receive the ultrasonic wave;

a first calculating device operable to determine a propagation time of the ultrasonic wave from said generator to said receiver;

a second calculating device operable to determine a flow rate based on the propagation time;

an informing device operable to inform of an operating state of the equipment which consumes the fluid and to which the conduit is to be connected;

a delay time setting device operable to set a delay time according to the operating state and operable to change the delay time, wherein the delay time is decreased when the flow rate increases; and a driving device operable to drive said ultrasonic wave generator and said receiver after the delay time has elapsed.

26. An ultrasonic flow meter comprising:

a conduit through which a fluid is to flow;

an ultrasonic wave generator, provided on said conduit, operable to emit an ultrasonic wave into the fluid;

a receiver provided in said conduit on an upstream or a downstream side of said ultrasonic wave generator with respect to a flowing direction of the fluid, operable to receive the ultrasonic wave;

a first calculating device operable to determine a propagation time in which the ultrasonic wave propagates from said ultrasonic wave generator to said receiver;

a second calculating device operable to determine a flow rate based on the propagation time;

a driving device operable to drive said ultrasonic wave;

a storage device operable to store the flow rate determined by said second calculating device, as flow rate data; and a breaker operable to cut, for a predetermined period of time, power to at least any one of said first calculating device, said second calculating device, and said driving device when the flow rate data of a flow rate of zero occurs a predetermined number of times in succession.

\* \* \* \* \*